United States Patent
Jeon et al.

(10) Patent No.: US 9,922,546 B2
(45) Date of Patent: Mar. 20, 2018

(54) REMOTE CONTROL SYSTEM AND METHOD FOR PORTABLE TERMINALS

(71) Applicant: Samsung Electronics Co., Ltd., Gyeonggi-do (KR)

(72) Inventors: Yeong-Hyo Jeon, Gyeonggi-do (KR); Jong-Hi Sung, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 409 days.

(21) Appl. No.: 14/021,285

(22) Filed: Sep. 9, 2013

(65) Prior Publication Data

US 2014/0009690 A1 Jan. 9, 2014

Related U.S. Application Data

(63) Continuation of application No. 12/001,789, filed on Dec. 11, 2007, now Pat. No. 8,548,453.

(30) Foreign Application Priority Data

Dec. 11, 2006 (KR) .................. 10-2006-0125533

(51) Int. Cl.
*H04M 3/00* (2006.01)
*G08C 17/02* (2006.01)
*H04M 1/725* (2006.01)

(52) U.S. Cl.
CPC ........ *G08C 17/02* (2013.01); *H04M 1/72533* (2013.01); *G08C 2201/40* (2013.01);
(Continued)

(58) Field of Classification Search
CPC ............................................. H04M 1/72533
(Continued)

(56) References Cited

U.S. PATENT DOCUMENTS 5,754,830 A * 5/1998 Butts .................. G06F 9/54
                                                     370/466
5,909,183 A    6/1999 Borgstahl et al.
(Continued)

FOREIGN PATENT DOCUMENTS

CN     1411259     4/2003
CN     1570904     1/2005
(Continued)

OTHER PUBLICATIONS

Korean Office Action dated Mar. 23, 2015 issued in counterpart application No. 10-2006-0125533.

*Primary Examiner* — Charles Shedrick
(74) *Attorney, Agent, or Firm* — The Farrell Law Firm, P.C.

(57) ABSTRACT

Provided are a remote control system and method for controlling portable terminals. The remote control system includes a control terminal which is a portable terminal that performs a remote control operation, a target terminal which is a portable terminal that is subject to the remote control operation performed by the control terminal, and a remote control management server which determines whether the control terminal and the target terminal are heterogeneous, and if the two terminals are heterogeneous, converts messages respectively transmitted from the control terminal and the target terminal to a format conforming to corresponding receiving terminals.

24 Claims, 9 Drawing Sheets

(52) U.S. Cl.
CPC ..... *G08C 2201/50* (2013.01); *G08C 2201/61* (2013.01); *G08C 2201/93* (2013.01)

(58) Field of Classification Search
USPC .................................. 455/417–419; 709/223
See application file for complete search history.

(56) References Cited

U.S. PATENT DOCUMENTS

| | | | |
|---|---|---|---|
| 5,920,308 A | 7/1999 | Kim | |
| 6,020,881 A | 2/2000 | Naughton et al. | |
| 6,104,924 A * | 8/2000 | Shirai | H04M 1/72525 455/418 |
| 6,622,018 B1 * | 9/2003 | Erekson | G06F 1/1626 455/419 |
| 6,748,278 B1 * | 6/2004 | Maymudes | G05B 15/02 340/12.3 |
| 6,844,900 B2 | 1/2005 | Yuen | |
| 7,010,294 B1 * | 3/2006 | Pyotsia | G05B 19/042 340/3.1 |
| 7,024,256 B2 | 4/2006 | Krzyzanowski et al. | |
| 7,031,728 B2 * | 4/2006 | Beyer, Jr. | H04W 4/02 455/420 |
| 7,072,945 B1 * | 7/2006 | Nieminen | G08C 17/02 455/41.2 |
| 7,092,794 B1 | 8/2006 | Hill et al. | |
| 7,330,719 B2 * | 2/2008 | Foucher | G06Q 20/00 455/414.1 |
| 7,437,150 B1 * | 10/2008 | Morelli | G08C 17/02 455/418 |
| 7,536,182 B2 * | 5/2009 | Zhang | H04W 88/04 340/425.1 |
| 7,796,982 B2 * | 9/2010 | Mohanty | H04L 63/068 455/420 |
| 7,904,074 B2 * | 3/2011 | Karaoguz | H04L 12/2803 455/418 |
| 2002/0112047 A1 * | 8/2002 | Kushwaha | H04L 12/24 709/223 |
| 2003/0017825 A1 | 1/2003 | De Loye et al. | |
| 2003/0046584 A1 * | 3/2003 | Laksono | H04L 12/2602 726/4 |
| 2003/0078032 A1 * | 4/2003 | Pei | G08C 17/02 455/411 |
| 2003/0080874 A1 * | 5/2003 | Yumoto | G08C 17/02 340/13.23 |
| 2003/0088633 A1 * | 5/2003 | Chiu | H04L 29/06 709/206 |
| 2003/0095211 A1 | 5/2003 | Nakajima | |
| 2003/0139175 A1 * | 7/2003 | Kim | H04L 69/16 455/419 |
| 2003/0171113 A1 * | 9/2003 | Choi | H04L 12/2803 455/420 |
| 2003/0229900 A1 | 12/2003 | Reisman | |
| 2004/0036624 A1 * | 2/2004 | Ballew | G08C 17/02 340/12.23 |
| 2004/0122955 A1 * | 6/2004 | Park | G06F 17/3089 709/227 |
| 2004/0162871 A1 | 8/2004 | Pabla et al. | |
| 2004/0185877 A1 | 9/2004 | Asthana et al. | |
| 2004/0259537 A1 | 12/2004 | Ackley | |
| 2005/0064860 A1 * | 3/2005 | DeLine | G08C 17/02 455/420 |
| 2005/0090239 A1 * | 4/2005 | Lee | H04M 1/72525 455/418 |
| 2005/0289266 A1 | 12/2005 | Illowsky et al. | |
| 2006/0031192 A1 | 2/2006 | Blackwell et al. | |
| 2006/0031570 A1 | 2/2006 | Blackwell et al. | |
| 2006/0041649 A1 | 2/2006 | Blackwell et al. | |
| 2006/0044106 A1 * | 3/2006 | Hirose | H04L 12/2805 340/3.54 |
| 2006/0126603 A1 | 6/2006 | Shimizu et al. | |
| 2006/0148464 A1 * | 7/2006 | Dunko | H04M 1/6091 455/419 |
| 2006/0152401 A1 | 7/2006 | Spilo | |
| 2007/0002784 A1 * | 1/2007 | Edwards | G08C 23/04 370/315 |
| 2007/0050054 A1 * | 3/2007 | Sambandam Guruparan | G08C 19/28 700/65 |
| 2007/0057762 A1 * | 3/2007 | Han | G08C 17/02 340/5.26 |
| 2007/0190995 A1 * | 8/2007 | Wang | H04M 1/72552 455/419 |
| 2007/0259657 A1 * | 11/2007 | Cheng | H04M 1/72533 455/419 |
| 2007/0293194 A1 * | 12/2007 | Bisht | H04M 1/72533 455/411 |
| 2008/0034081 A1 * | 2/2008 | Marshall | G08C 17/02 709/223 |
| 2008/0057929 A1 * | 3/2008 | Min | G08C 17/02 455/418 |

FOREIGN PATENT DOCUMENTS

| | | |
|---|---|---|
| KR | 1020020062578 | 7/2002 |
| KR | 1020030028040 | 4/2003 |
| KR | 1020040000203 | 1/2004 |
| KR | 1020040108028 | 12/2004 |
| KR | 1020060078831 | 7/2006 |
| WO | WO 03/028300 | 4/2003 |
| WO | WO 2006/107181 | 10/2006 |

\* cited by examiner

REMOTE CONTROL SYSTEM AND METHOD FOR PORTABLE TERMINALS

PRIORITY

This application is a Continuation Application of U.S. application Ser. No. 12/001,789, which was filed in the U.S. Patent & Trademark Office on Dec. 11, 2007 and claims priority under 35 U.S.C. §119 to an application filed in the Korean Intellectual Property Office on Dec. 11, 2006 and assigned Serial No. 10-2006-0125533, the contents of each of which are incorporated herein by reference.

BACKGROUND OF THE INVENTION

1. Field of the Invention

The present invention relates generally to a remote control system and method for portable terminals, and in particular, to a remote control system and method in which portable terminals can be remotely accessed and controlled by providing a remote control management server so that a remote control command is relayed between the portable terminals.

2. Description of the Related Art

With the recent proliferation of portable terminals, a mobile phone providing wireless voice call and data exchange is beginning to be regarded as personal necessity. Conventional portable terminals have generally provided only wireless calls. However, along with technical advances and introduction of the wireless Internet, portable terminals are now used for many purposes in addition to telephone calls or schedule management. For example, images can be captured by using a digital camera included in a portable terminal. Further, the portable terminal provides a variety of functions such as viewing a satellite broadcasting program, games and Web surfing using the wireless Internet.

A typical portable terminal is used to receive services by accessing a server. These days, however, various contents can be generated and stored by the use of a portable terminal, and a large data size can be handled by a large capacity storage device included in the portable terminal. Moreover, the portable terminal is emerging as a tool for providing services with the growing processing capability and network speed.

A large amount of data stored in the portable terminal cannot be utilized when the portable terminal is lost or when a user does not carry it. This problem can be easily addressed using a remote control method in which a portable terminal can be remotely accessed and controlled.

For example, remote control is used when one Personal Computer (PC) (i.e., control PC) accesses another PC (i.e., target PC) operating under the same Operation System (OS). By performing the remote control between PCs, the control PC can access the target PC and thus can see a screen of the target PC and directly execute programs stored in the target PC. In addition, the control PC can use peripheral devices of the target PC. Further, communication can be achieved between peripheral devices of the control PC and those of the target PC. This is possible because the peripheral devices of either the control PC or the target PC are implemented conforming to several standards, and thus have relatively good hardware compatibility. However, the remote control between the PCs is valid only when the PCs operate under the same OS and with a high- speed network bandwidth.

Since a User Interface (UI) is different among portable terminal manufacturers, it is difficult to meet the requirement that the PCs have to operate under the same OS. Further, even if that requirement is met, a specific data transfer rule has to be defined to share data between the PCs.

Therefore, there is a demand for a remote control system and method for providing remote control to not only homogeneous portable terminals but also heterogeneous portable terminals.

SUMMARY OF THE INVENTION

The present invention provides a remote control system and method for portable terminals.

The present invention provides a remote control system and method in which portable terminals can be remotely accessed and controlled by providing a remote control management server so that a remote control command is relayed between the portable terminals.

The present invention provides a remote control system and method in which not only homogeneous portable terminals but also heterogeneous portable terminals can be remotely accessed and controlled by providing a remote control management server so that a remote control command is relayed between the portable terminals.

The present invention provides a remote control system and method in which a remote control management server converts a remote control command message to a format conforming to a target terminal, and thus remote control can be achieved between heterogeneous portable terminals.

The present invention provides a remote control system and method in which a remote control management server converts a remote control response message to a format conforming to a control terminal, and thus remote control can be achieved between heterogeneous portable terminals.

According to an aspect of the present invention, there is provided a remote control system for portable terminals, including a control terminal which is a portable terminal that performs a remote control operation, a target terminal which is a portable terminal that is subject to the remote control operation performed by the control terminal, and a remote control management server which determines whether the control terminal and the target terminal are heterogeneous, and if the two terminals are heterogeneous, converts messages respectively transmitted from the control terminal and the target terminal to a format conforming to corresponding receiving terminals.

According to an aspect of the present invention, there is provided a remote control method for a control terminal in a remote control system, including upon detecting a remote control event, generating a remote control request message including information on a target terminal and transmitting it to the target terminal via a remote control management server, upon receiving a remote control grant message from the target terminal via the remote control management server, determining whether a remote control response message is received, and upon receiving the remote control response message, outputting video or audio data included in the remote control response message.

According to an aspect of the present invention, there is provided a remote control method for a target terminal in a remote control system, including upon receiving a remote control request message, determining the validity of remote control request by performing a pre-defined authentication process, if the remote control request is valid, generating a remote control grant message and transmitting it to a control terminal via a remote control management server, generating a remote control response message including video/audio data to be output, and transmitting the remote control response message to the control terminal via the remote control management server.

According to an aspect of the present invention, there is provided a remote control relay method for a remote control management server in a remote control system, including upon receiving a remote control request message from a control terminal, selecting a target terminal and transmitting the received remote control request message to the target terminal, after receiving the remote control request message, transmitting a remote control grant message to the control terminal upon receiving the remote control grant message from the target terminal, after transmitting the remote control grant message to the control terminal, determining specification (spec) information of the control terminal and the target terminal, and if the checking result shows that the two terminals are heterogeneous, converting a received message to a format conforming to a receiving terminal and transmitting it to the receiving terminal, and otherwise, relaying the remote control command between the two terminals by simply transmitting the received message.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity and conciseness.

Figure 1:
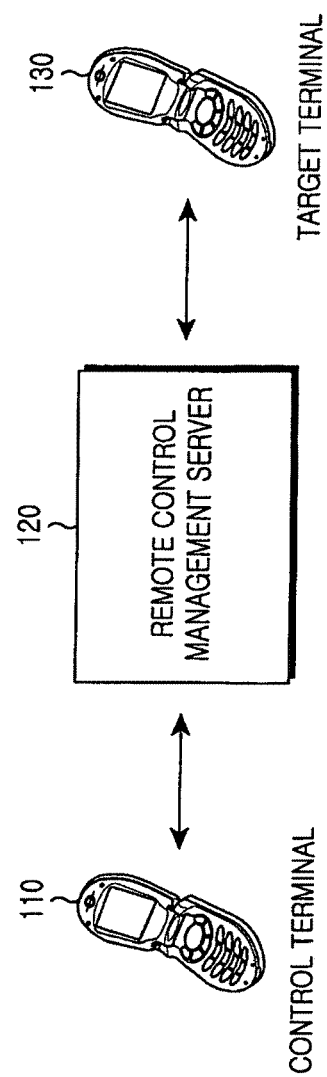
FIG. 1 illustrates a remote control system according to the present invention.

FIG. 1 illustrates a remote control system according to the present invention. Referring to FIG. 1, the remote control system includes a control terminal 110, a remote control management server 120 and a target terminal 130. The control terminal 110 is a portable terminal that performs a remote control operation. The remote control management server 120 relays a remote control command. The target terminal 130 is a portable terminal that is subject to the remote control operation.

The control terminal 110 and the target terminal 130 may be heterogeneous. In this case, upon receiving the remote control command from the control terminal 110, the remote control management server 120 transmits the remote control command to the target terminal 130 after converting it to a format conforming to the target terminal 130. Upon receiving a remote control response message from the target terminal 130, the remote control management server 120 transmits the remote control response message to the control terminal 110 after converting it to a format conforming to the control terminal 110. Details of components constituting the remote control system will be described below.

Figure 2:
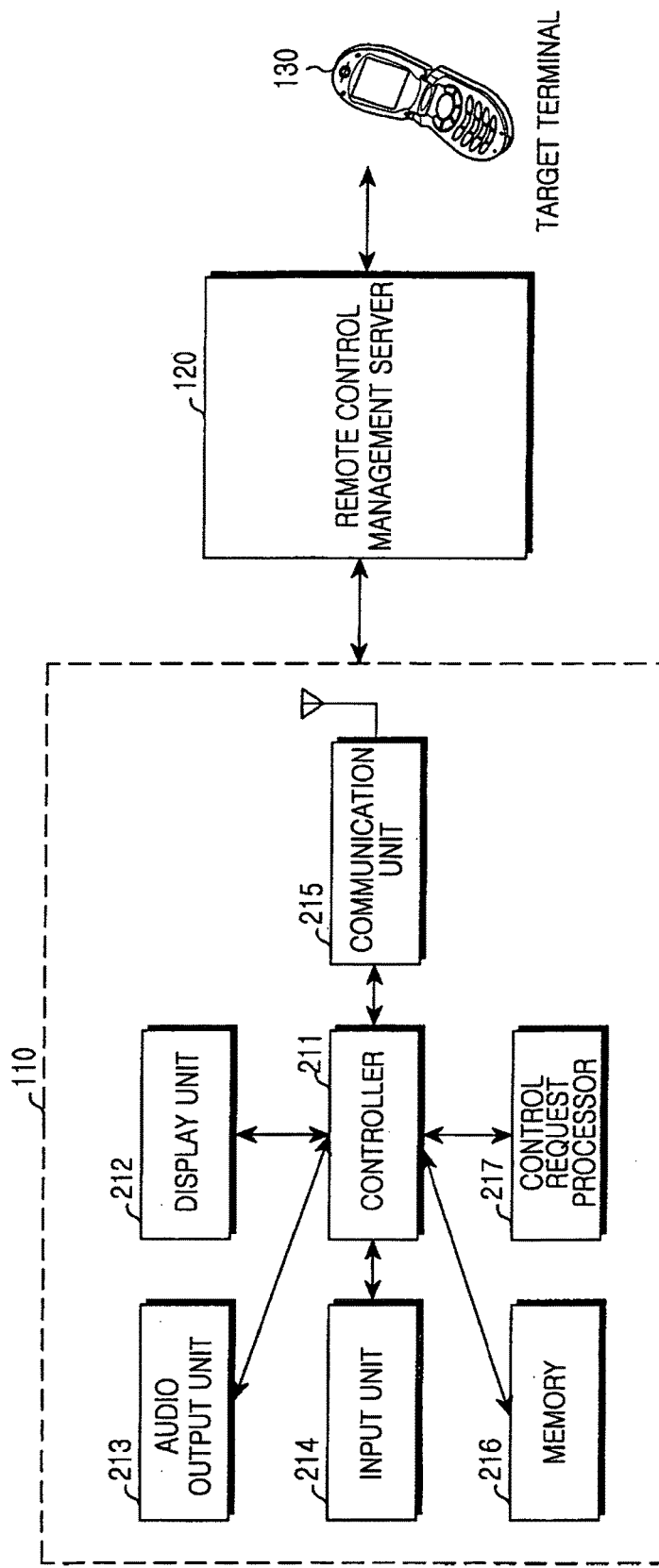
FIG. 2 is a block diagram of a control terminal shown in FIG. 1.

FIG. 2 is a block diagram of the control terminal 110 of FIG. 1. Referring to FIG. 2, the control terminal 110 includes a controller 211, a display unit 212, an audio output unit 213, an input unit 214, a communication unit 215, a memory 216 and a control request processor 217.

The display unit 212 displays state information (or indicator) of the control terminal 110, alphanumerical characters, moving pictures and still pictures. Further, the display unit 212 displays image data included in the remote control response message received from the target terminal 130. The display unit 212 may be a color Liquid Crystal Display (LCD).

The audio output unit 213 is a speaker for outputting audio sound. Under the control of the control request processor 217, audio data is received from the target terminal 130 according to the remote control response message, and the received audio data is output through the audio output unit 213.

The remote control command is received through the input unit 214 using a keypad or a touch screen by a user, thereby controlling the control terminal 110 and the target terminal 130.

The communication unit 215 communicates with the remote control management server 120 to transmit/receive the remote control message. In this case, in a receiving process, a frequency of a Radio Frequency (RF) signal received trough an antenna is decreased, and then the received signal is de-spread and channel-decoded. In addition, in a transmitting process, the received signal is channel-coded and spread, and then the frequency thereof is increased for transmission through the antenna.

The memory 216 stores a program for controlling an overall operation of the control terminal 110, an application program and data (e.g., phone numbers, Short Message Service (SMS) messages, compressed images and moving pictures). Optionally, the memory 216 stores product information (i.e., product spec) of the control terminal 110.

When a remote control event is detected, the control request processor 217 generates a remote control request message and transmits it to the remote control management server 120. When a remote control grant message is received from the target terminal 130 after performing an authentication process, the control request processor 217 generates a remote control command message including the remote control message received through the input unit 214 and transmits it to the remote control management server 120. When the remote control response message is received from the target terminal 130, the control request processor 217 respectively outputs video and audio data to the display unit 212 and the audio output unit 213.

During the authentication process, the target terminal 130 may send a password request. Then, the control request processor 217 receives a password through the input unit 214 and transmits it to the target terminal 130 via the remote control management server 120.

In addition to providing the overall control to the control terminal 110, the controller 211 controls the control request processor 217. Although the controller 211 and the control request processor 217 are separately implemented herein, the present invention is not limited thereto. Thus, in practice, a function of the control request processor 217 may be performed by the controller 211.

Figure 3:
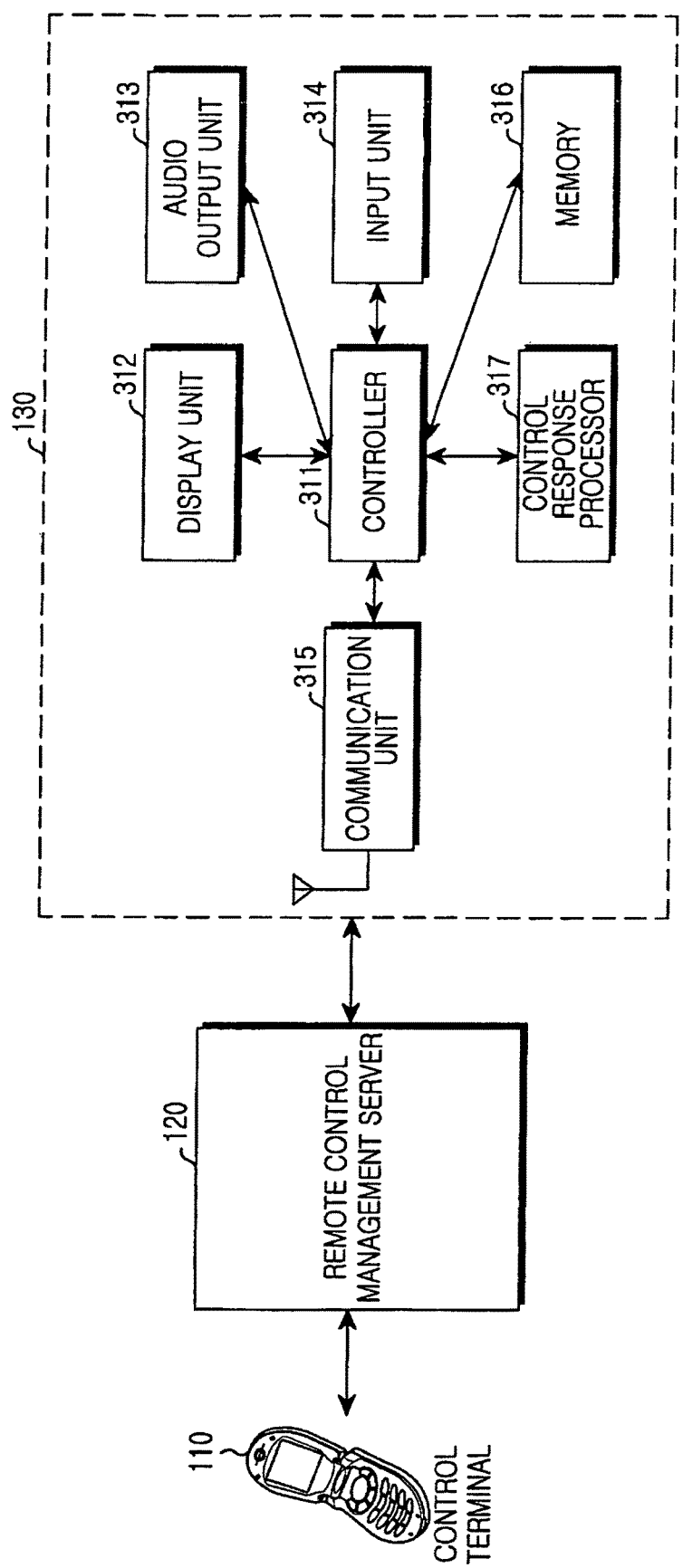
FIG. 3 is a block diagram of a target terminal shown in FIG. 1.

FIG. 3 is a block diagram of the target terminal 130 of FIGS. 1 and 2. Referring to FIG. 3, the target terminal 130 includes a controller 311, a display unit 312, an audio output unit 313, an input unit 314, a communication unit 315, a memory 316 and a control response processor 317.

The display unit 312 displays state information (or indicator) of the control terminal 110, alphanumerical characters, moving pictures and still pictures. The display unit 312 may be a color Liquid Crystal Display (LCD).

The audio output unit 313 is a type of speaker for generating or receiving audio data, and outputting audio sound.

The remote control command is received through the input unit 314 using a keypad or a touch screen by the user.

The communication unit 315 communicates with the remote control management server 120 to transmit/receive the remote control message. In this case, in a receiving process, a frequency of an RF signal received trough an antenna is decreased, and then the received signal is de-spread and channel-decoded. In addition, in a transmitting process, the received signal is channel-coded and spread, and then the frequency thereof is increased for transmission through the antenna.

The memory 316 stores a program for controlling an overall operation of the target terminal 130, an application program and data (e.g., phone numbers, SMS messages, compressed images and moving pictures). Further, the memory 316 stores a password for authentication and a control grant list that contains information regarding which terminal has granted the use of the remote control. Optionally, the memory 316 stores product information (i.e., product spec) of the target terminal 130.

Upon receiving a remote control request message, the control response processor 317 determines the validity of the remote control request by performing an authentication process. If the remote control request is valid, a remote control grant message is generated. Upon receiving a remote control command message, the control response processor 317 executes the remote control command included in the received remote control command message. Further, a remote control response message including video/audio data is generated under the control of the control response processor 317, wherein the video/audio data is periodically output within a time interval. The generated remote control response message is transmitted to the remote control management server 120.

Instead of being periodically generated, the remote control response message may be generated only when the video data is modified or when the audio data is output. This is because last received video data can be continuously displayed only when there is no audio data output and no video data modification in the control terminal 110.

Various authentication methods may be used by the control response processor 317 in the authentication process. Three representative examples of the authentication methods are performed as follows. First, a password is requested, and a received password is compared with a pre-stored password. Second, the control terminal 110 sends the remote control request message, and the control grant list stored in the memory 316 is checked to determine whether the control terminal 110 has granted remote control. Third, a user of the target terminal 130 directly grants the use of the target terminal 130 using the input unit 314 when the remote control request message is received.

In addition to providing the overall control to the target terminal 130, the controller 311 controls the control response processor 317. Although the controller 311 and the control request processor 317 are separately implemented herein, the present invention is not limited thereto. Thus, in practice, a function of the control request processor 317 may be performed by the controller 311.

Furthermore, although the control terminal 110 and the target terminal 130 are distinctively depicted in FIGS. 2 and 3, in practice, however, one portable terminal may be used for both the control terminal 110 and the target terminal 130. That is, the configurations depicted in FIGS. 2 and 3 may be integrated into one system.

Accordingly, the controllers 211 and 311 control the control request processor 217 and the control response processor 317. Although the processors 217 and 317 and the controller 211 and 311 are separately implemented herein, the present invention is not limited thereto. Thus, functions of the processors 217 and 317 may be entirely or partially performed by the controllers 211 and 311.

Figure 4:
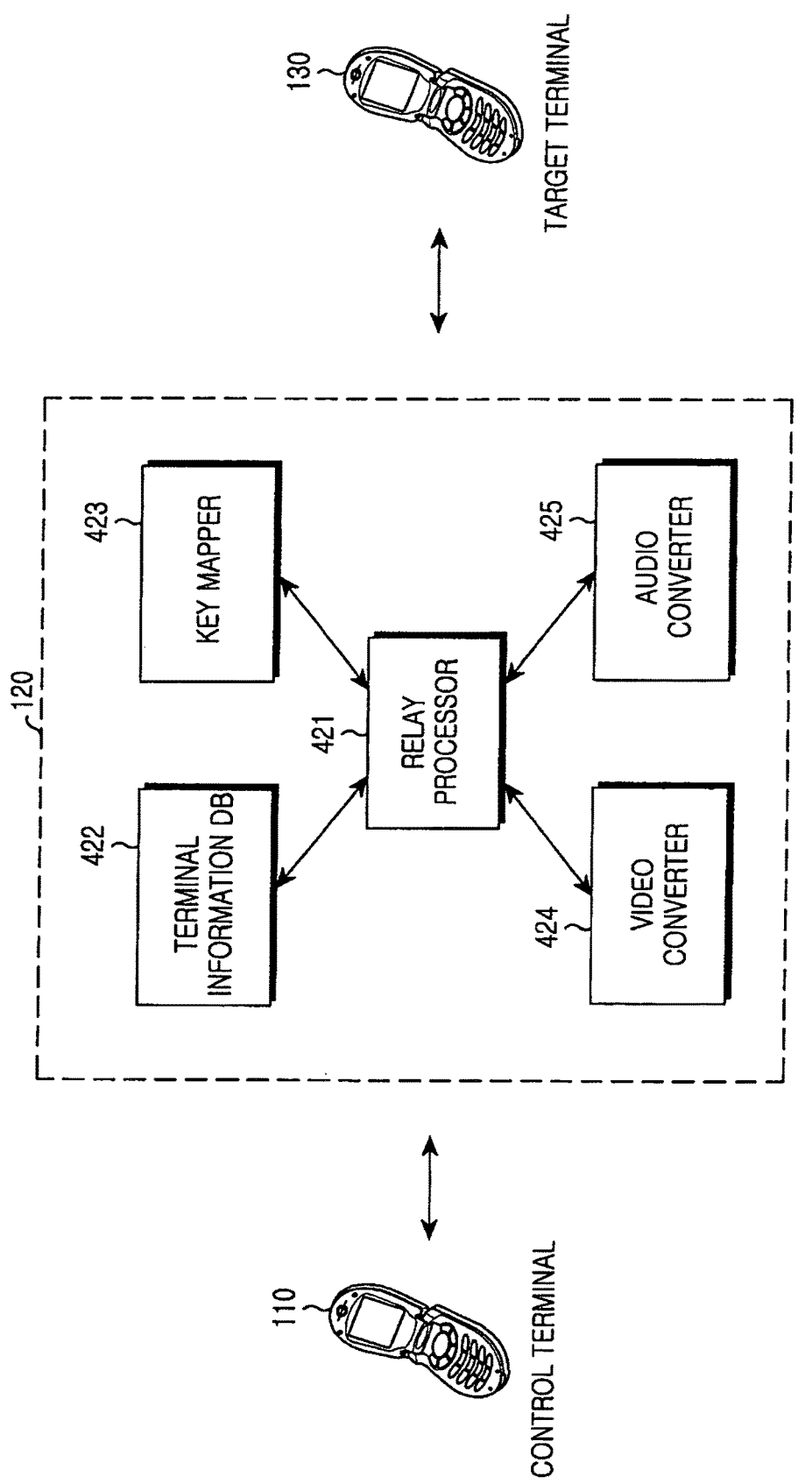
FIG. 4 is a block diagram of a remote control management server shown in FIG. 1.

FIG. 4 is a block diagram of the remote control management server 120 of FIGS. 1 to 3. Referring to FIG. 4, the remote control management server 120 includes a relay processor 421, a terminal information DataBase (DB) 422, a key mapper 423, a video converter 424 and an audio converter 425.

The terminal information DB 422 stores spec information such as information on an OS of a portable terminal and information on a Codec for outputting video and audio data. The terminal information DB 422 may be incorporated into the remote control management server 120 or may be stored in a server provided by a portable terminal manufacturer.

When the control terminal 110 and the target terminal 130 are heterogeneous, according to the spec information of the target terminal 130, the key mapper 423 converts input key information, which is included in a remote control command message received from the control terminal 110, to a format conforming to the target terminal 130.

Also in this case, according to the spec information of the control terminal 110, the video converter 424 converts video data, which is included in the remote control response message received from the target terminal 130, to a format conforming to the control terminal 110.

In addition, according to the spec information of the control terminal 110, the audio converter 425 converts audio data, which is included in the remote control response message received from the target terminal 130, to a format conforming to the control terminal 110.

The relay processor 421 relays a message transmitted/received between the control terminal 110 and the target terminal 130. The spec information of the two terminals 110 and 130 is read from the terminal information DB 422. If the spec information shows that the two terminals 110 and 130 are homogeneous terminals, the relay processor 421 simply delivers the message received. Otherwise, the message is converted to a format conforming to a receiving terminal, and then is transmitted to the receiving terminal via the key mapper 423, the video converter 424 and the audio converter 425.

Figure 5:
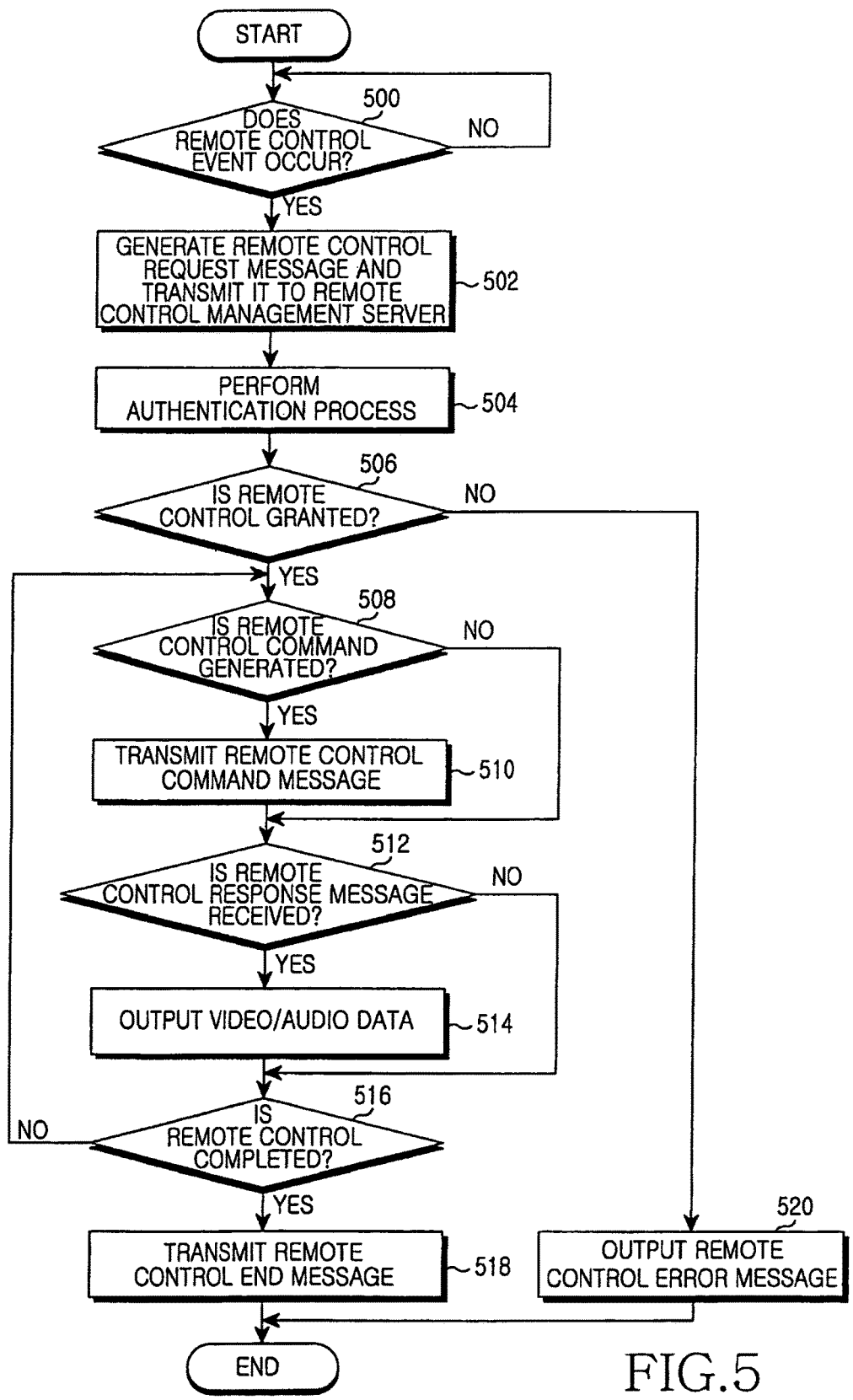
FIG. 5 illustrates a remote control process performed by the control terminal shown in FIG. 1.

FIG. 5 illustrates a remote control process performed by the control terminal 110.

Referring to FIG. 5, it is determined whether a remote control event occurring at the request of a user is detected in step 500. If so, in step 502, a remote control request message including information (e.g., phone number) of the target terminal 130 is generated and transmitted to the target terminal 130 via the remote control management server 120. In step 504, the target terminal 130 is subject to an authentication process, which may be performed using various conventional schemes. For example, a password based authentication process may be used in which a password is requested when the control terminal 110 performs the authentication process, the user then inputs the password, the input password is then transmitted to the target terminal 130 via the remote control management server 120.

In step 506, it is determined whether remote control is granted. The remote control is regarded as being granted when a remote control grant message is received.

If a remote control error message is received in step 506 instead of receiving the remote control grant message, in step 520, the received remote control error message is output, and the procedure is ended.

Otherwise, in step 508, it is determined whether a remote control command is generated to control the target terminal 130. If no remote control command is generated, the procedure goes to step 512, as will be described below.

Upon detecting the remote control command in step 508, a remote control command message including the remote control command is generated and transmitted to the target terminal 130 via the remote control management server 120 in step 510.

In step 512, it is determined whether a remote control response message is received. If no message is received, the procedure goes to step 516, as will be described below.

Upon receiving the remote control response message in step 512, video or audio data included in the remote control response message is output in step 514. Then, in step 516, it is determined whether remote control is completed. If the remote control is not completed, the procedure returns to step 508.

Upon detecting the completion of the remote control in step 516, the procedure goes to step 518, and thus a remote control end message is transmitted to the target terminal 130 via the remote control management server 120. The procedure is then ended.

In the flow of FIG. 5, the remote control process is ended when the completion of remote control is detected by the control terminal 110, and this is informed to the target terminal 130. Alternatively, however, when a remote control end event occurs in the target terminal 130, the control terminal 110 may receive the remote control end message from the target terminal 130 via the remote control management server 120, thereby completing the remote control. In this case, prior to completing the remote control, a message indicating the completion of remote control is displayed on the display unit of the control terminal 110.

Figure 6:
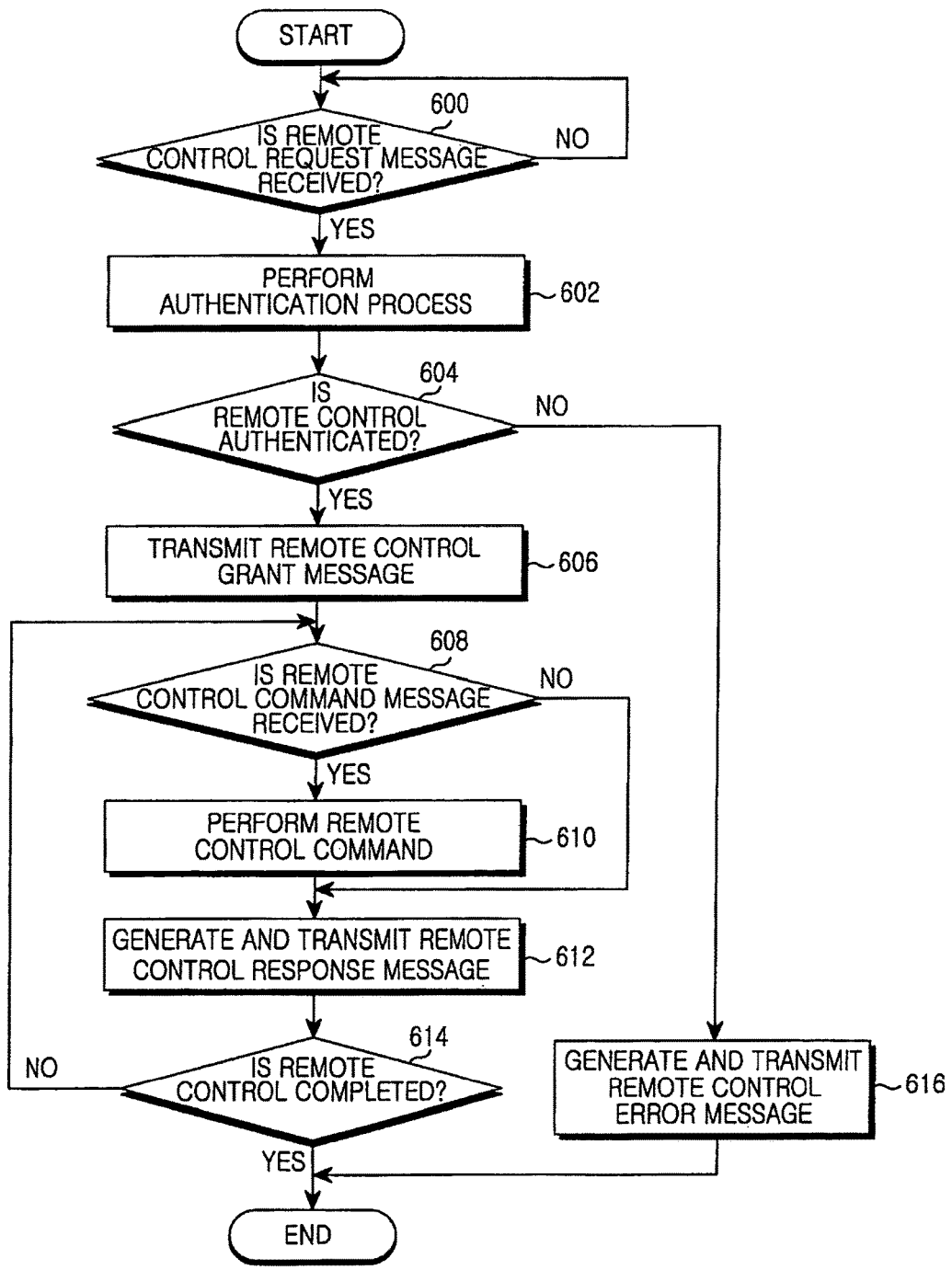
FIG. 6 illustrates a remote control process performed by the target terminal shown in FIG. 1.

FIG. 6 illustrates the remote control process performed by the target terminal 130.

Referring to FIG. 6, upon receiving a remote control request message in step 600, an authentication process is performed in step 602 using one of various conventional schemes. For example, a password based authentication process may be used in which a password request is sent to the control terminal 110 via the remote control management server 120 when the target terminal 130 performs the authentication process, and a password is input from the control terminal 110 via the remote control management server 120 and is compared with a pre-stored password.

In step 604, authentication of the requested remote control is checked in response to the result of the authentication process of step 602. If the authentication is not valid in step 604, the procedure goes to step 616 and thus a remote control error message is generated and transmitted to the control terminal 110 via the remote control management server 120.

However, if the authentication is valid in step 604, a remote control grant message is generated and transmitted to the control terminal 110 via the remote control management server 120 in step 606. Then, in step 608, it is determined whether a remote control command message is received. If no message is received in step 608, the procedure goes to step 612, as will be described below.

Upon receiving the remote control command message in step 608, the procedure goes to step 610 and thus a remote control command included in the remote control command message is executed. Then, in step 612, a remote control response message including video/audio data output from the target terminal 130 is generated and transmitted to the control terminal 110 via the remote control management server 120.

The remote control response message may be periodically generated in step 612 within a time interval or may be generated only when video data is modified or audio data is output.

In step 614, a remote control end message is received to detect a remote control end event. If no message is received, the procedure returns to step 608. Otherwise, the procedure is ended.

In the flow of FIG. 6, the remote control process is ended when the remote control end message is received through the remote control management server 120. Alternatively, however, when the remote control end event occurs at the request of a user or due to power shortage, the target terminal 130 may generate a remote control end message and transmit it to the control terminal 110 via the remote control management server 120, thereby ending the remote control process.

Figure 7:
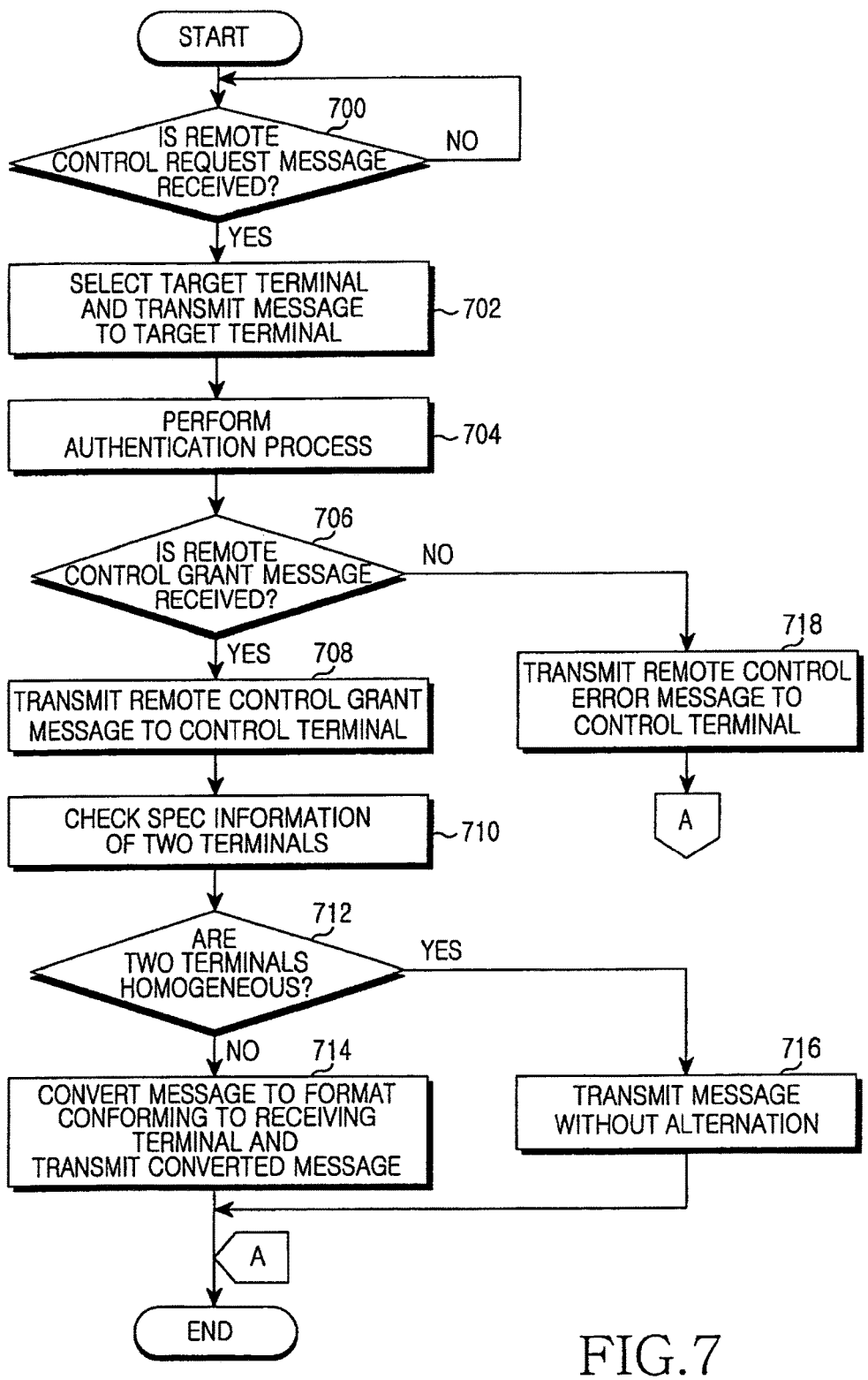
FIG. 7 illustrates a relay process performed by the remote control management server shown in FIG. 1.

FIG. 7 illustrates the relay process performed by the remote control management server 120.

Referring to FIG. 7, upon the remote control management server 120 receiving a remote control request message from the control terminal 110 in step 700, the remote control management server 120 selects in step 702 the target terminal 130 and transmits the received remote control request message to the target terminal 130.

An authentication process in step 704 is performed on the control terminal 110 that attempts to access the target terminal 130. In this case, information required for authentication is relayed. The authentication process may be performed using various conventional schemes. For example, a password based authentication process may be in which the remote control management server 120 relays a password request. The password based authentication process is achieved such that, upon receiving a password request for the target terminal 130, the password request is sent to the control terminal 110, and a password transmitted from the control terminal 110 is sent to the target terminal 130.

In step 706, it is determined whether a remote control grant message is received from the target terminal 130. If a remote control error message is received instead of receiving the remote control grant message, the received remote control error message is transmitted to the control terminal 110, and the procedure is then ended.

However, upon receiving the remote control grant message in step 706, the received remote control grant message is transmitted to the control terminal 110 in step 708. Then, spec information of the control terminal 110 and the target terminal 130 is checked in step 710. The spec information may be obtained by searching the terminal information DB in the remote control management server 120. Alternatively, the spec information may be provided by a mobile terminal manufacturer or directly received from a terminal.

In step 712, by using the spec information, it is determined whether the two terminals 110 and 130 are homogeneous or heterogeneous. If the result of step 712 shows that the two terminals 110 and 130 are heterogeneous, in step 714, a received message is converted to a format conforming to a receiving terminal and is then transmitted to the receiving terminal. Details of step 714 will be described below with reference to FIG. 8. Otherwise, in step 716, the received message is simply delivered to the receiving terminal. Details of step 716 will be described below with reference to FIG. 9.

Figure 8:
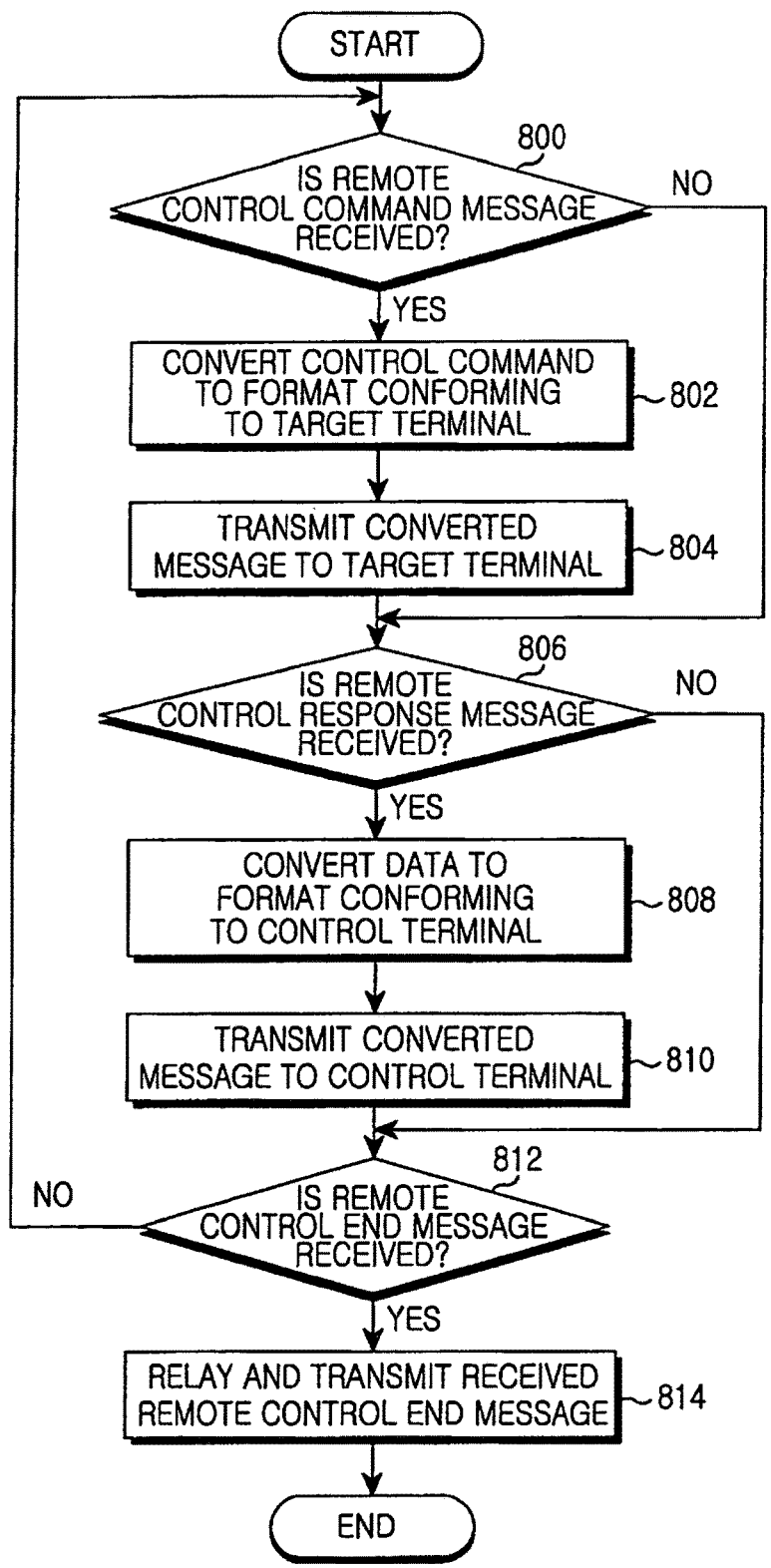
FIG. 8 illustrates a relay process performed by the remote control management server shown in FIG. 1 when a remote control process is carried out between two heterogeneous terminals.

FIG. 8 illustrates a relay process performed by the remote control management server 120 when a remote control process is carried out between two heterogeneous terminals.

Referring to FIG. 8, upon a remote control command message being received in step 800, by using spec information of the two heterogeneous terminals, a remote control command, which corresponds to input key information and is included in the received remote control command message, is converted in step 802 to a format conforming to the target terminal 130. In step 804, the converted message is transmitted to the target terminal 130.

In step 806, it is determined whether a remote control response message is received. Upon receiving the remote control response message, in step 808, by using the spec information, video/audio data included in the remote control response message is converted to a format conforming to the control terminal 110. In step 810, the converted message is transmitted to the control terminal 110.

In step 812, it is determined whether a remote control end message is received from the control terminal 110 or the target terminal 130. If the remote control end message is not received, the procedure goes to step 800. If the remote control end message is received, the process goes to step 814. In step 814, if it is received from the control terminal 110, the remote control end message is transmitted to the target terminal 130 upon being received from the control terminal 110, whereas it is transmitted to the control terminal 110 upon being received from the target terminal 130. The procedure is then ended.

Figure 9:
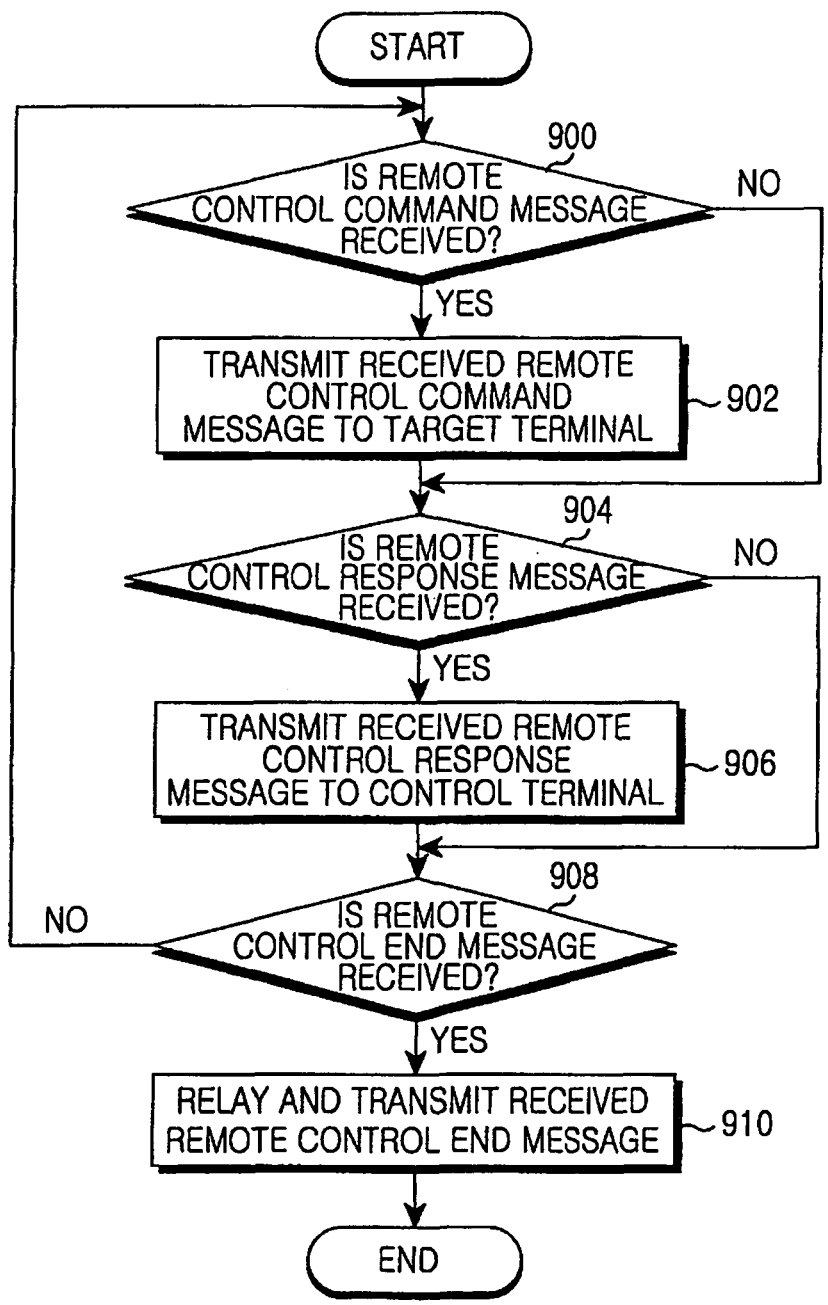
FIG. 9 illustrates a relay process performed by the remote control management server shown in FIG. 1 when a remote control process is carried out between two homogeneous terminals.

FIG. 9 illustrates a relay process performed by the remote control management server 120 when a remote control process is carried out between two homogeneous terminals.

Referring to FIG. 9, when a remote control command message is received in step 900, the received remote control command message is transmitted to the target terminal 130 in step 902. Upon receiving a remote control response message in step 904, the received remote control response message is transmitted to the control terminal 110 in step 906.

In step 908, it is determined whether a remote control end message is received from the control terminal 110 or the target terminal 130. Upon receiving the remote control end message, in step 910, the received remote control end message is transmitted to the target terminal 130 when it is received from the control terminal 110, whereas it is transmitted to the control terminal 110 upon being received from the target terminal 130. The procedure is then ended.

According to the present invention, there is provided a remote control system including a control terminal which is a portable terminal (i.e., a subject of remote control) that controls another portable terminal (i.e., an object of remote control), a target terminal which is a portable terminal (i.e., an object of remote control) that is controlled by the control terminal, and a remote control management server which determines whether the control terminal and the target terminal are heterogeneous, and if the two terminals are heterogeneous, converts messages respectively transmitted from the control terminal and the target terminal to a format conforming to corresponding receiving terminals. Therefore, there is an advantage in that remote control can be provided to heterogeneous portable terminals, thereby providing convenience in use.

While the invention has been shown and described with reference to a certain preferred embodiment thereof, it is a mere exemplary application. Thus, it will be understood by those skilled in the art that various changes in form and details may be made therein without departing from the spirit and scope of the invention as defined by the appended claims.

What is claimed is:

1. A method in an electronic device, the method comprising:
    generating, upon detecting a remote control event for remote control of a target terminal, a remote control request message including information on the target terminal;
    transmitting the remote control request message to a remote control management server;
    receiving, from the remote control management server, a remote control grant message from the target terminal;
    checking, upon receiving the remote control grant message, whether a remote control event is received;
    outputting, upon receiving the remote control event, data corresponding to the remote control event; and
    transmitting the data corresponding to remote control event to the remote control management server, which, if the target terminal is a different type from the electronic device, converts the data to a format conforming to the target terminal based on checked specification information of the electronic device and the target terminal, before transmitting the data on to the target terminal.

2. The method of claim 1, further comprising, after transmitting the remote control request message;
    receiving a request for a password for authentication from the remote control management server at the request of the target terminal and transmitting the password to the target terminal via the remote control management server.

3. The method of claim 1, wherein the remote control event is a remote control command for controlling the target terminal, the output data comprise a remote control command message including the remote control command, and the output data comprising the remote control command message is transmitted to the target terminal via the remote control management server.

4. The method of claim 1, wherein the remote control event is a remote control end event, the data comprises a remote control end message, and the data including the remote control end message is transmitted to the target terminal via the remote control management server.

5. The method of claim 4, further comprising;
    receiving a remote control end message from the target terminal via the remote control management server;

transmitting to the remote control management server a message indicating completion of remote control; and ending the remote control.

6. A method in an electronic device, the method comprising:
receiving a remote control request message from a remote control management server, wherein the remote control request is from a control terminal;
determining, upon receiving the remote control request message, validity of the remote control request by performing an authentication process;
generating, if the remote control request is valid, a remote control grant message and transmitting the remote control grant message to the remote control management server, which transmits the remote control request to the control terminal;
receiving data from the remote control management server which was output by the control terminal:
generating a remote control response message concerning the data to be processed by the electronic device; and
transmitting the remote control response message to the remote control management server, which, if the control terminal is a different type from the electronic device, converts the remote control response message to a format conforming to the control terminal based on checked specification information of the electronic device and the control terminal, before transmitting it on to the control terminal.

7. The method of claim 6, wherein determining the validity of the remote control request comprises, if the authentication process is based on:
a password, sending a password request to the control terminal via the remote control management server, and upon receiving the password, the authentication is determined by comparing the received password with a password stored in a memory;
registered terminal information, checking whether a control terminal information to be authenticated is included in a control grant list stored in the memory; and
a user, the user of the electronic device performs the authentication.

8. The method of claim 6, further comprising, when the received data is a remote control command message from the control terminal via the remote control management server, executing a remote control command included in the remote control command message.

9. The method of claim 6, wherein, the remote control response message includes data to be converted, which data is periodically output.

10. The method of claim 6, wherein the received data includes at least one of video data and audio data.

11. The method of claim 6, further comprising:
detecting a remote control end event;
generating a remote control end message; and
transmitting the remote control end message to the control terminal via the remote control management server.

12. The method of claim 11, further comprising:
receiving a corresponding remote control end message from the control terminal via the remote control management server;
outputting a message indicating completion of remote control; and
ending the remote control.

13. An electronic device comprising:
a controller; and
a communication unit,
wherein the controller is configured to:

generate, upon detecting a remote control event for remote control of a target terminal, a remote control request message including information on the target terminal and transmitting the remote control request message a remote control management server;
receive, from the remote control management server, a remote control grant message from the target terminal;
check, upon receiving the remote control grant message, whether a remote control event is received;
output, upon receiving the remote control event, data corresponding to the remote control event; and
transmit the data corresponding to remote control event to the remote control management server, which, if the target terminal is a different type from the electronic device, converts the data to a format conforming to the target terminal based on checked specification information of the electronic device and the target terminal, before transmitting the data on to the target terminal, and
wherein the communication unit is configured to, under the control of the controller, communicate with the remote control management server.

14. The device of claim 13, wherein the controller is further configured to receive a request for a password for authentication from the remote control management server at a request of the target terminal and to transmit the password to the target terminal via the remote control management server.

15. The device of claim 13, wherein the remote control event comprises a remote control command for controlling the target terminal, the output data comprises a remote control command message including the remote control command, and the output data including the remote control command message is transmitted to the target terminal via the remote control management server.

16. The device of claim 13, wherein the remote control event comprises a remote control end event, the output data comprises a remote control end message, and the data comprising the remote control end message is transmitted to the target terminal via the remote control management server.

17. The device of claim 16, wherein the controller is further configured to, upon receiving a remote control end message from the target terminal via the remote control management server, output a message indicating completion of remote control, transmitting the message indicating completion of remote control to the target terminal via the remote control management server, and ending the remote control.

18. An electronic device comprising:
a controller; and
a communication unit,
wherein the controller is configured to:
receive a remote control request message from a remote control management server, wherein the remote control request is from a control terminal;
determine, upon receiving the remote control request message, whether the remote control request is valid by performing an authentication process;
generate, if the remote control request is valid, a remote control grant message and transmit the message to a remote control management server, which transmits the remote control request to the control terminal; to
receive data from the remote control management server which was output by the control terminal;

generate a remote control response message concerning the data to be processed by the electronic device; and transmit the remote control response message to the remote control management server, which, if the control terminal is a different type from the electronic device, converts the remote control response message to a format conforming to the control terminal based on checked specification information of the electronic device and the control terminal, before transmitting it on to the control terminal;

wherein the communication unit is configured to, under the control of the controller, communicate with a remote control management server.

19. The device of claim 18, wherein determining the validity of the remote control request comprises, if the authentication process is based on:

a password, sending a password request to the control terminal via the remote control management server, and upon receiving the password, the authentication is determined by comparing the received password with a password stored in a memory;

registered terminal information, checking whether a control terminal information is included in a control grant list stored in the memory; and a user, the user of the electronic device performs the authentication.

20. The device of claim 18, wherein the controller is further configured to, upon receiving data comprising a remote control command message from the control terminal via the remote control management server, execute a remote control command included in the remote control command message.

21. The device of claim 18, wherein the controller is further configured to output periodically data within a time interval when the received data comprises remote control command including data to be periodically output by the electronic device.

22. The device of claim 18, wherein the received data includes at least one of video data and audio data.

23. The device of claim 18, wherein the controller is further configured to, upon detecting a remote control end event, generate a remote control end message and transmit the remote control end message to the control terminal via the remote control management server.

24. The device of claim 23, wherein the controller is further configured to, upon receiving a corresponding remote control end message from the control terminal via the remote control management server, output a message indicating completion of remote control and ending the remote control.

* * * * *